United States Patent
Zhang

(10) Patent No.: US 10,936,152 B2
(45) Date of Patent: Mar. 2, 2021

(54) METHOD FOR DISPLAYING VIEW AND TERMINAL DEVICE

(71) Applicant: Huawei Technologies Co., Ltd., Shenzhen (CN)

(72) Inventor: Dong Zhang, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 298 days.

(21) Appl. No.: 15/570,206

(22) PCT Filed: Apr. 27, 2015

(86) PCT No.: PCT/CN2015/077521
§ 371 (c)(1),
(2) Date: Oct. 27, 2017

(87) PCT Pub. No.: WO2016/172825
PCT Pub. Date: Nov. 3, 2016

(65) Prior Publication Data
US 2018/0136799 A1    May 17, 2018

(51) Int. Cl.
*G06F 3/14* (2006.01)
*G06F 3/048* (2013.01)
(Continued)

(52) U.S. Cl.
CPC ............ *G06F 3/0482* (2013.01); *G06F 3/048* (2013.01); *G06F 3/04886* (2013.01); *H04M 1/725* (2013.01)

(58) Field of Classification Search
CPC ........... G06F 3/14; G06F 3/048; G06F 3/0482
(Continued)

(56) References Cited

U.S. PATENT DOCUMENTS

| 8,458,648 B2* | 6/2013 | Dangeville ............... G06F 8/38 717/105 |
| 2002/0004408 A1 | 1/2002 | Masuda et al. |

(Continued)

FOREIGN PATENT DOCUMENTS

| CN | 1333639 A | 1/2002 |
| CN | 102713813 A | 10/2012 |
| CN | 103823618 A | 5/2014 |

OTHER PUBLICATIONS

Foreign Communication From a Counterpart Application, PCT Application No. PCT/CN2015/077521, English Translation of International Search Report dated Feb. 1, 2016, 2 pages.
(Continued)

*Primary Examiner* — Ruay Ho
(74) *Attorney, Agent, or Firm* — Conley Rose, P.C.

(57) ABSTRACT

A method for displaying a view and a terminal device, where the method is applied to a terminal device on which a view control and at least one application are installed. The view control is a control in an operating system of the terminal device, and the method includes grouping multiple to-be-displayed objects in a first application using the view control, allocating a group identifier to each group, establishing mapping relationships between objects in each group and the group identifier of the group, generating, using the view control, a view comprising all the group identifiers and the multiple objects, displaying at least a part of the view, and preferentially displaying an object corresponding to a first group identifier when receiving a selection instruction for the first group identifier.

20 Claims, 4 Drawing Sheets

(51) Int. Cl.
  *G06F 3/0482* (2013.01)
  *H04M 1/725* (2021.01)
  *G06F 3/0488* (2013.01)
(58) Field of Classification Search
  USPC .................. 715/810, 234; 707/710; 348/47; 717/105
  See application file for complete search history.

(56) References Cited

U.S. PATENT DOCUMENTS

| | | | |
|---|---|---|---|
| 2002/0109718 A1* | 8/2002 | Mansour | G06F 9/452 715/744 |
| 2006/0238613 A1* | 10/2006 | Takayama | G06T 15/405 348/47 |
| 2010/0005422 A1 | 1/2010 | Wu | |
| 2011/0154259 A1 | 6/2011 | Kennedy et al. | |
| 2012/0197862 A1* | 8/2012 | Woytowitz | G06F 16/36 707/710 |
| 2012/0290984 A1 | 11/2012 | Gong et al. | |
| 2014/0136977 A1 | 5/2014 | Arun et al. | |
| 2015/0242373 A1* | 8/2015 | Xue | G06F 9/54 715/234 |

OTHER PUBLICATIONS

Foreign Communication From a Counterpart Application, PCT Application No. PCT/CN2015/077521, English Translation of Written Opinion dated Feb. 1, 2016, 6 pages.
Foreign Communication From a Counterpart Application, European Application No. 15890205.6, Extended European Search Report dated Mar. 6, 2018, 8 pages.

\* cited by examiner

METHOD FOR DISPLAYING VIEW AND TERMINAL DEVICE

CROSS-REFERENCE TO RELATED APPLICATIONS

This application is a U.S. National Stage of International Patent Application No. PCT/CN2015/077521 filed on Apr. 27, 2015, which is hereby incorporated by reference in its entirety.

TECHNICAL FIELD

Embodiments of the present disclosure relate to the field of computer technologies, and in particular, to a method for displaying a view and a terminal device.

BACKGROUND

A ListView control is used to sort multiple to-be-displayed objects in an application to generate a view, and display some objects in the view on a terminal device. The ListView control can respond to an operation instruction of a tap or slide event. For example, after receiving an operation instruction triggered by a tap or slide, the ListView control updates the displayed view. In this way, a user may find a target object using a tap or slide operation instruction. When the method is used to generate a view, if there are many objects, it is very time-consuming for a terminal device to find a target object.

To resolve the foregoing problem, an alphabetical sorting control is defined in a contact application. The alphabetical sorting control can sort multiple to-be-displayed contacts in the contact application according to initial letters of personal names, and generate a view using the ListView. In addition, the view further includes 26 preset letters (from A to Z). When a user triggers any letter of the 26 letters, a user interface of the contact application displays a contact whose initial letter is the letter.

However, in the foregoing solution, the alphabetical sorting control is based on a single application. In other words, only objects in an application including the alphabetical sorting control can be sorted according to initial letters to generate a view. Therefore, the application scope of the foregoing solution is relatively narrow.

SUMMARY

Embodiments of the present disclosure provide a method for displaying a view and a terminal device in order to generate a view using a view control in an operating system and display the view to expand the application scope of the method for displaying a view and the terminal device.

To achieve the foregoing objective, the following technical solutions are used in the embodiments of the present disclosure.

According to a first aspect, a method for displaying a view is provided, where the method is applied to a terminal device on which a view control and at least one application are installed, the view control is a control in an operating system of the terminal device, and the method includes grouping multiple to-be-displayed objects in a first application using the view control, where the first application is any application of the at least one application, allocating a group identifier to each group, establishing mapping relationships between objects in each group and the group identifier of the group, generating, using the view control, a view including all the group identifiers and the multiple objects, displaying at least a part of the view, and preferentially displaying an object corresponding to the first group identifier when receiving a selection instruction for a first group identifier, where the first group identifier is any group identifier of all the group identifiers.

With reference to the first aspect, in a first possible implementation manner, grouping multiple to-be-displayed objects in a first application using the view control includes sorting the multiple to-be-displayed objects in the first application using the view control, and grouping the multiple sorted objects.

With reference to the first possible implementation manner of the first aspect, in a second possible implementation manner, grouping the multiple sorted objects includes grouping the multiple sorted objects according to a sorting attribute of the sorting.

With reference to the second possible implementation manner of the first aspect, in a third possible implementation manner, grouping the multiple sorted objects according to a sorting attribute of the sorting includes grouping the multiple sorted objects according to a character corresponding to each object when a type of the sorting attribute of the sorting is a character string type, or grouping the multiple sorted objects according to a value corresponding to each object when a type of the sorting attribute of the sorting is a value type.

With reference to the first possible implementation manner of the first aspect, in a fourth possible implementation manner, grouping the multiple sorted objects includes grouping the multiple sorted objects according to a preset quantity, where each group includes a preset quantity of objects.

With reference to the first aspect or any possible implementation manner of the first aspect above, in a fifth possible implementation manner, grouping multiple to-be-displayed objects in a first application using the view control includes grouping the multiple objects using the view control when a quantity of the multiple to-be-displayed objects in the first application is greater than or equal to a preset threshold.

According to a second aspect, a terminal device is provided, where a view control and at least one application are installed on the terminal device, the view control is a control in an operating system of the terminal device, and the terminal device includes a grouping unit configured to group multiple to-be-displayed objects in a first application using the view control, where the first application is any application of the at least one application, an allocation unit configured to allocate a group identifier to each group, an establishment unit configured to establish mapping relationships between objects in each group and the group identifier of the group, a generation unit configured to generate, using the view control, a view including all the group identifiers and the multiple objects, a display unit configured to display at least a part of the view, and a receiving unit configured to receive a selection instruction for a first group identifier, where the first group identifier is any group identifier of all the group identifiers, and the display unit is further configured to preferentially display an object corresponding to the first group identifier when the receiving unit receives the selection instruction for the first group identifier.

With reference to the second aspect, in a first possible implementation manner, the grouping unit includes a sorting subunit configured to sort the multiple to-be-displayed objects in the first application using the view control, and a grouping subunit configured to group the multiple sorted objects.

With reference to the first possible implementation manner of the second aspect, in a second possible implementation manner, the grouping subunit is further configured to group the multiple sorted objects according to a sorting attribute of the sorting.

With reference to the second possible implementation manner of the second aspect, in a third possible implementation manner, the grouping subunit is further configured to group the multiple sorted objects according to a character corresponding to each object when a type of the sorting attribute of the sorting is a character string type, or group the multiple sorted objects according to a value corresponding to each object when a type of the sorting attribute of the sorting is a value type.

With reference to the first possible implementation manner of the second aspect, in a fourth possible implementation manner, the grouping subunit is further configured to group the multiple sorted objects according to a preset quantity, where each group includes a preset quantity of objects.

With reference to the second aspect or any possible implementation manner of the second aspect above, in a fifth possible implementation manner, the grouping unit is further configured to group the multiple objects using the view control when a quantity of the multiple to-be-displayed objects in the first application is greater than or equal to a preset threshold.

According to a third aspect, a terminal device is provided, where a view control and at least one application are installed on the terminal device, the view control is a control in an operating system of the terminal device, and the terminal device includes a memory, a processor, a display, and an input apparatus, where the memory is configured to store a set of program code, where the program code is used to control the processor to execute the following operations grouping multiple to-be-displayed objects in a first application using the view control, where the first application is any application of the at least one application, allocating a group identifier to each group, establishing mapping relationships between objects in each group and the group identifier of the group, and generating, using the view control, a view including all the group identifiers and the multiple objects. The display is configured to display at least a part of the view. The input apparatus is configured to receive a selection instruction for a first group identifier, where the first group identifier is any group identifier of all the group identifiers, and the display is further configured to preferentially display an object corresponding to the first group identifier when the input apparatus receives the selection instruction for the first group identifier.

With reference to the third aspect, in a first possible implementation manner, the processor is further configured to sort the multiple to-be-displayed objects in the first application using the view control, and group the multiple sorted objects.

With reference to the first possible implementation manner of the third aspect, in a second possible implementation manner, the processor is further configured to group the multiple sorted objects according to a sorting attribute of the sorting.

With reference to the second possible implementation manner of the third aspect, in a third possible implementation manner, the processor is further configured to group the multiple sorted objects according to a character corresponding to each object when a type of the sorting attribute of the sorting is a character string type, or group the multiple sorted objects according to a value corresponding to each object when a type of the sorting attribute of the sorting is a value type.

With reference to the first possible implementation manner of the third aspect, in a fourth possible implementation manner, the processor is further configured to group the multiple sorted objects according to a preset quantity, where each group includes a preset quantity of objects.

With reference to the third aspect and the first possible implementation manner to the fourth possible implantation manner of the third aspect, in a fifth possible implementation manner, the processor is further configured to group the multiple objects using the view control when a quantity of the multiple to-be-displayed objects in the first application is greater than or equal to a preset threshold.

In the foregoing technical solution, a terminal device groups to-be-displayed objects in a first application using a view control in an operating system, allocates a group identifier to each group, establishes mapping relationships between objects in each group and the group identifier corresponding to the group in order to generate a view including all the group identifiers and the multiple objects, displays at least a part of the view, and preferentially displays an object corresponding to the first group identifier when receiving a selection instruction for a first group identifier. In this way, when a user needs to search for and select a target object, the user may rapidly determine a general range of the target object by selecting a group identifier in order to search for the target object within the range, thereby improving a rate of searching for the target object. In addition, the view control in this solution is a control in the operating system, and therefore can generate a view for every application installed on the terminal device. Compared with the other approaches in which a control based on an application generates a view for an object in the application, this solution can expand the application scope.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all the embodiments of the present disclosure. All other embodiments obtained by a person of ordinary skill in the art based on the embodiments of the present disclosure without creative efforts shall fall within the protection scope of the present disclosure.

Figure 1:
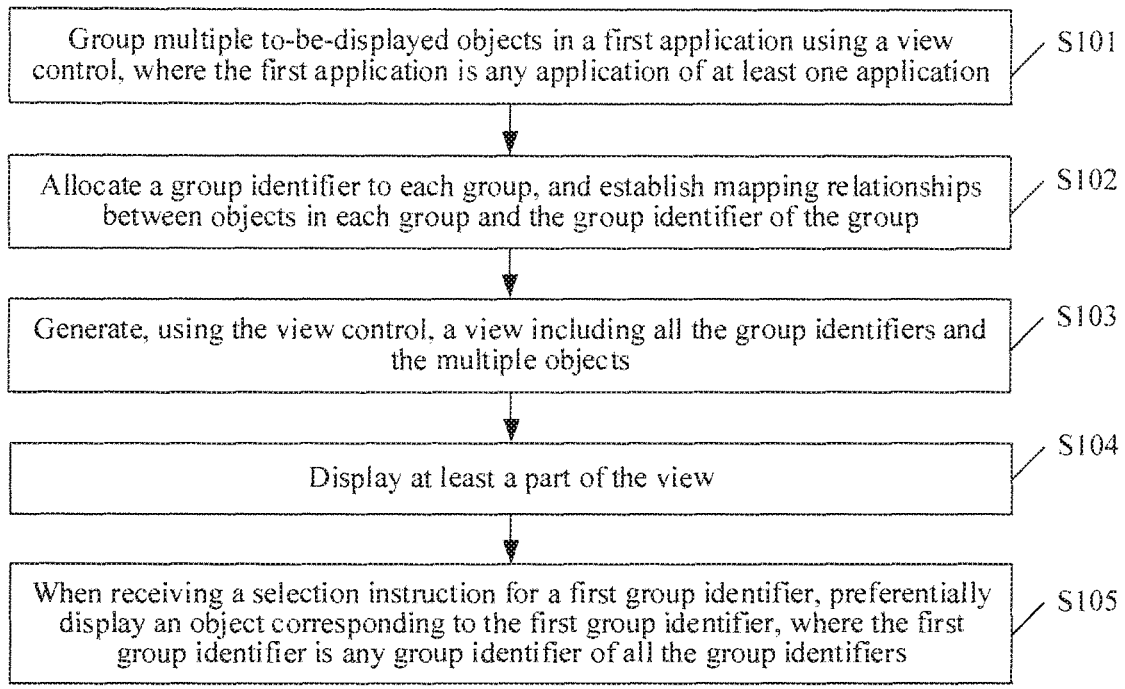
FIG. 1 is a schematic flowchart of a method for displaying a view according to an embodiment of the present disclosure.

FIG. 1 shows a method for displaying a view according to an embodiment of the present disclosure. The method is applied to a terminal device on which a view control and at least one application are installed, the view control is a control in an operating system of the terminal device, and the method includes the following steps.

Step S101: Group multiple to-be-displayed objects in a first application using the view control, where the first application is any application of the at least one application.

The "terminal device" may be a smart phone, a tablet computer, or the like. The "operating system of the terminal device" may be an ANDROID operating system, a SYMBIAN operating system, a BLACKBERRY operating system, or the like. The "view control" may be a list view control, a grid view control, a tree view control, or the like. The "application" may be an inherent application in the terminal device or may be a third-party application, for example, a contact application, a gallery application, a file management application, a music player application, or a social application. The "object" may be a text, an image, audio, a video, or a folder. Objects in different applications may be the same or may be different.

This embodiment of the present disclosure does not limit a condition of triggering the terminal device to perform step S101. For example, performing may be triggered when an object in the first application is updated, or may be triggered when an indication message of a user is received.

During specific implementation, the terminal device may further include an adapter. The adapter may be used as a bridge between applications installed on the terminal device and the view control in the operating system of the terminal device, and configured to transmit multiple objects in the applications and attributes of the objects (for example, a name and a creation time) to the view control such that the terminal device groups, using the view control, multiple to-be-displayed objects in an application that are transmitted to the view control.

This embodiment of the present disclosure does not limit a specific grouping manner in step S101. The grouping may be performed in any manner in the other approaches, or may be performed in a grouping manner provided in the following description.

Optionally, in step S101, before grouping the multiple objects using the view control, the terminal device may obtain a quantity of the multiple to-be-displayed objects in the first application, and only when the quantity of the multiple to-be-displayed objects is greater than or equal to a preset threshold, the terminal device groups the multiple objects using the view control.

This embodiment of the present disclosure does not limit a specific value of the "preset threshold," which may be determined according to an actual requirement or a user indication, or may be preset in the terminal device according to an empirical value before delivery of the terminal device. The optional implementation manner can improve a rate of searching for a target object when there are a relatively large quantity of objects.

Step S102: Allocate a group identifier to each group, and establish mapping relationships between objects in each group and the group identifier of the group.

For example, the terminal device may allocate a group identifier to each group according to a shared attribute of objects in the group. For example, when initial letters of names of objects in each group are all "h," the letter "h" is used as a group identifier of the group. For another example, when creation times of objects in each group are all April 2015, the April 2015 may be used as a group identifier of the group. Certainly, the terminal device may set a personalized group identifier of each group according to an actual requirement of a user. For example, the user may indicate a group identifier of each group to the terminal device in a manner such as voice input or manual input.

Step S103: Generate, using the view control, a view including all the group identifiers and the multiple objects.

For example, the view generated by the view control includes all the group identifiers in step S102 and all the objects in step S101, and may further include attributes of the objects and the like. For example, when the first application is a contact application, the "view" may include all personal names of contacts in the contact application and group identifiers of all groups to which all the personal names of the contacts belong, and may further include attributes of each object such as a phone number and a home address.

Step S104: Display at least a part of the view.

For example, the terminal device may display, on a display of the terminal device, all the group identifiers and some objects of the multiple objects in the view, or may display, on a display of the terminal device, some group identifiers and some objects of the multiple objects in the view.

It should be noted that, when there are a relatively small quantity of group identifiers and objects, the terminal device may display the entire generated view, that is, the terminal device may display all the group identifiers and all the objects.

Step S105: When receiving a selection instruction for a first group identifier, preferentially display an object corresponding to the first group identifier, where the first group identifier is any group identifier of all the group identifiers.

The "selection instruction" may include but not limited to a tap operation instruction, a slide operation instruction, and the like. It should be noted that, after performing step S102, the terminal device can obtain objects corresponding to each group identifier.

Step S105 may be described as follows. When receiving a selection instruction for a first group identifier, preferentially display objects corresponding to the first group identifier according to mapping relationships between the first group identifier and objects in a group corresponding to the first group identifier.

For example, when receiving a selection instruction for a first group identifier, the terminal device may first display some or all objects corresponding to the first group identifier, and after finish displaying all the objects corresponding to the first group identifier, display an object corresponding to another group identifier.

Further, when the first group identifier corresponds to a relatively large quantity of objects, the terminal device may first display some objects corresponding to the first group identifier, and continue to display another object corresponding to the first group identifier in response to a trigger operation of a user such as a slide operation or a tap operation, and display an object corresponding to another group identifier after finish displaying all the objects corresponding to the first group identifier. When the first group identifier corresponds to a relatively small quantity of objects, the terminal device may first display all the objects corresponding to the first group identifier, and display an object corresponding to another group identifier after finish displaying all the objects corresponding to the first group identifier.

According to the method for displaying a view provided in this embodiment of the present disclosure, a terminal device groups to-be-displayed objects in a first application using a view control in an operating system, allocates a group identifier to each group, establishes mapping relationships between objects in each group and the group identifier corresponding to the group in order to generate a view including all the group identifiers and the multiple objects, displays at least a part of the view, and preferentially displays an object corresponding to the first group identifier when receiving a selection instruction for a first group identifier. In this way, when a user needs to search for and select a target object, the user may rapidly determine a general range of the target object by selecting a group identifier in order to search for the target object within the range, thereby improving a rate of searching for the target object. In addition, the view control in this solution is a control in the operating system, and therefore can generate a view for every application installed on the terminal device. Compared with the other approaches in which a control based on an application generates a view for an object in the application, this solution can expand the application scope.

Figure 2:
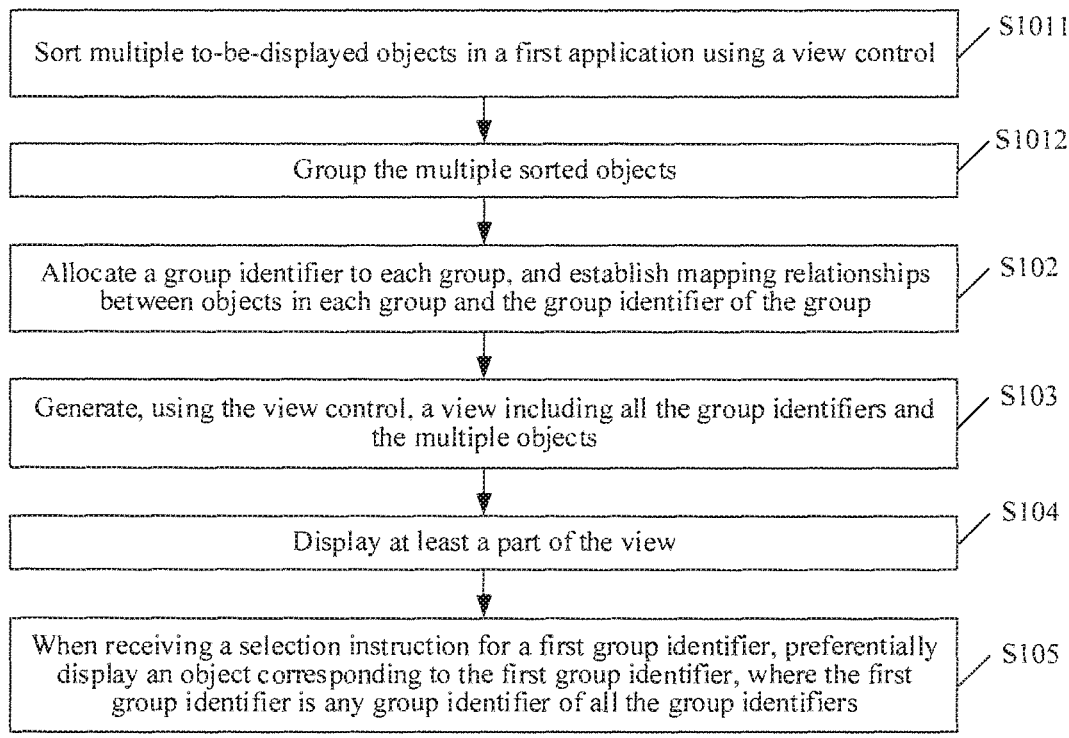
FIG. 2 is a schematic flowchart of another method for displaying a view according to an embodiment of the present disclosure.

In another method for displaying a view provided in an embodiment of the present disclosure, as shown in FIG. 2, on the basis of the embodiment shown in FIG. 1, step S101 may further include the foregoing steps.

Step S1011: Sort the multiple to-be-displayed objects in the first application using the view control.

For example, step S1011 may include sorting, by the terminal device according to a sorting attribute of the multiple to-be-displayed objects in the first application, the multiple objects using the view control. For example, when the "application" is a contact application, the "object" may be a contact, and the "sorting attribute" may be an initial character of a personal name of a contact, an address name of a contact, or the like. For another example, when the "application" is a gallery application, the "object" may be an image, and the "sorting attribute" may be an initial character of a name of an image, a creation time of an image, a size of storage space occupied by an image, or the like. For still another example, when the "application" is a music player application, the "object" may be a song, and the "sorting attribute" may be an initial character of a name of a song, a personal name of a singer corresponding to a song, a size of storage space occupied by a song, or the like.

This embodiment of the present disclosure does not limit a manner of the "sorting." For example, when the "object" is an image, if the "sorting attribute" is a size of storage space occupied by an image, a manner of the "sorting" may be a descending order, or may be an ascending order. For another example, when the "object" is a contact, if the "sorting attribute" is an initial character of a personal name of a contact, a manner of the "sorting" may be an order from A (or a) to Z (or z) according to an initial letter of a name of a contact, or may be an order from Z (or z) to A (or a). Other examples are not listed herein one by one.

It should be noted that, when "first characters" of some objects are numbers or other characters instead of letters (such as "?" and "*"), these objects may be arranged before or behind all objects whose initial characters are letters. In this case, when subsequent steps are performed, these objects may be grouped into one or more groups, and group identifiers are allocated.

Step S1012: Group the multiple sorted objects.

In an implementation manner of this embodiment, the multiple sorted objects are grouped according to a sorting attribute of the sorting, which may further include grouping the multiple sorted objects according to a character corresponding to each object when a type of the sorting attribute of the sorting is a character string type, or grouping the multiple sorted objects according to a value corresponding to each object when a type of the sorting attribute of the sorting is a value type. Refer to the following description for specific examples.

In another implementation manner of this embodiment, the multiple sorted objects are grouped according to a preset quantity, where each group includes a preset quantity of objects. The preset quantity corresponding to each group may be a specific value, a value range, an algebraic expression for calculating the quantity, or the like. For example, the algebraic expression may be W÷N, where W denotes a quantity of the multiple objects and N denotes a quantity of group identifiers. During specific implementation, N may be determined according to an actual requirement or an empirical value. In addition, in this implementation manner, preset quantities corresponding to different groups may be the same or may be different.

Figure 3:
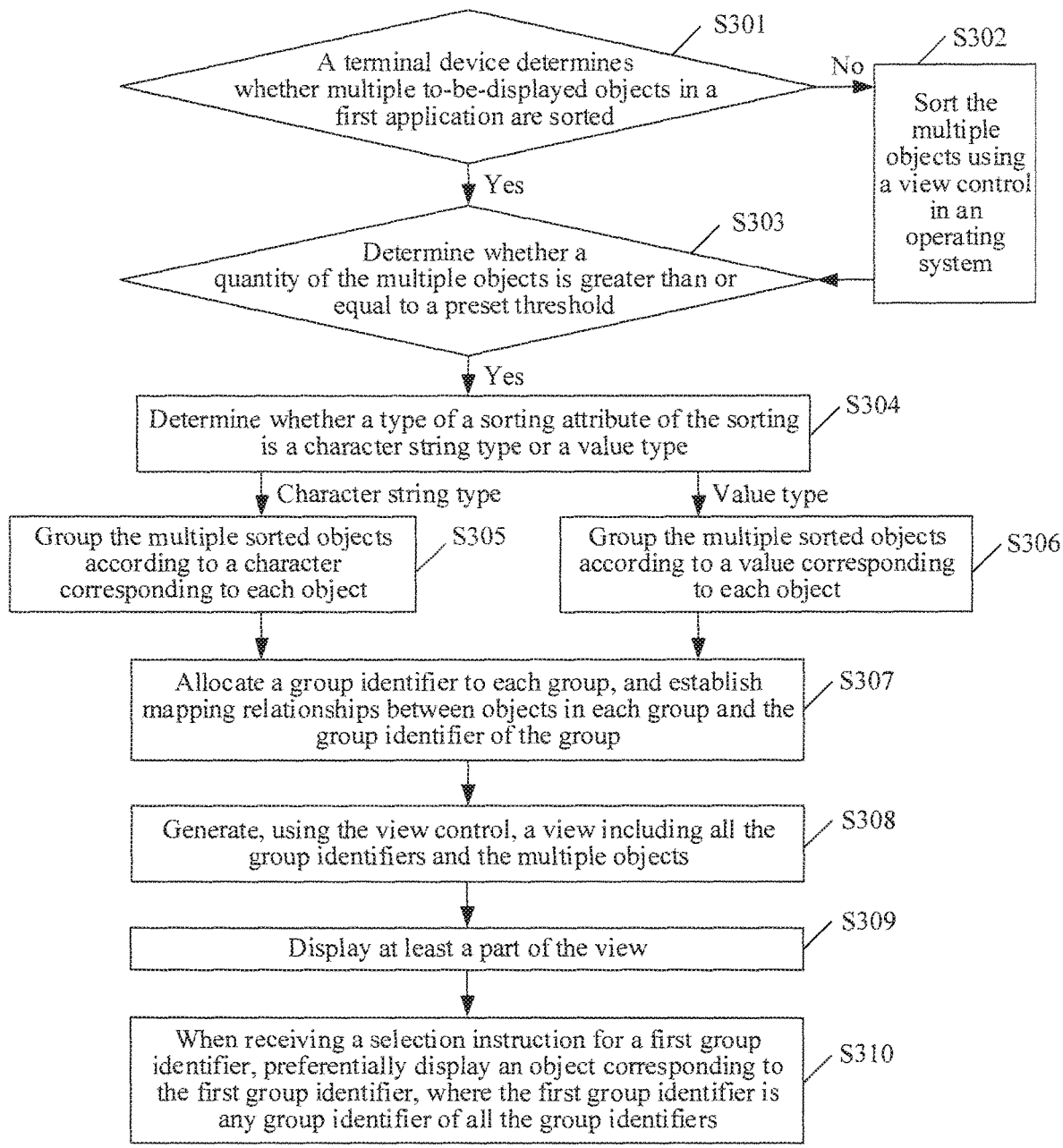
FIG. 3 is a schematic flowchart of another method for displaying a view according to an embodiment of the present disclosure.

FIG. 3 shows another method for displaying a view according to an embodiment of the present disclosure. The method includes the following steps.

Step S301: A terminal device determines whether multiple to-be-displayed objects in a first application are sorted.

If not, step S302 is performed. If yes, step S303 is performed.

Step S302: Sort the multiple objects using a view control in an operating system.

Step S303: Determine whether a quantity of the multiple objects is greater than or equal to a preset threshold.

If not, the process ends. If yes, step S304 is performed.

It should be noted that, during specific implementation, the terminal device may first determine whether the quantity of the multiple objects is greater than the preset threshold, and sort the multiple objects using the view control in the operating system when the quantity of the multiple objects is greater than the preset threshold. Then step S304 is performed.

Step S304: Determine whether a type of a sorting attribute of the sorting is a character string type or a value type. The "value type" may include a float value type or an integer type.

If the type of the sorting attribute of the sorting is a character string type, step S305 is performed. If the type of the sorting attribute of the sorting is a value type, step S306 is performed.

The "type of the sorting attribute" may be distinguished according to an actual situation, or may be determined according to experience. For example, the "sorting attribute" is a name, then when names of a majority of objects are character strings (including a pinyin, an English name, a Chinese character, and the like), the "type of the sorting attribute" is a character string type, and when names of a majority of objects are numbers (for example, using a number as a name of an image), the "type of the sorting attribute" is a value type. For another example, the "sorting attribute" is a personal name, then it may be considered, according to experience, that the "type of the sorting attribute" is a character string type. For still another example, the "sorting attribute" is a creation time or a size of occupied storage space, then it may be considered, according to experience, that the "type of the sorting attribute" is a value type.

Step S305: Group the multiple sorted objects according to a character corresponding to each object. Step S307 is performed after step S305 is performed.

EXAMPLE 1

When the "sorting attribute" is a personal name, a name, or the like, the multiple sorted objects may be grouped according to an initial character of a personal name or a name. For example, objects whose initial characters are a same letter (which may be any letter from A (or a) to Z (or z)) are grouped into one group, objects whose initial characters are numbers are grouped into one group, and objects whose initial characters are other characters are grouped into one group.

Step S306: Group the multiple sorted objects according to a value corresponding to each object. Step S307 is performed after step S306 is performed.

EXAMPLE 2

When the "sorting attribute" is a creation time, the terminal device may group the multiple sorted objects according to a month or a year of a creation time. For example, objects whose creation times are in a same month are grouped into one group.

EXAMPLE 3

When the "sorting attribute" is a size of occupied storage space, the terminal device may group the multiple sorted objects according to values of sizes of storage space occupied by the multiple objects. For example, sizes of storage space occupied by 100 objects range from 3.00 megabytes (MB) to 13.00 MB, and then the objects may be grouped in the following manner grouping objects that occupies storage space whose sizes range from 3.00 MB to 4.00 MB into one group, grouping objects that occupies storage space whose sizes range from 4.00 M to 5.00 M into one group, and so on such that the objects are grouped into 10 groups.

Step S307: Allocate a group identifier to each group, and establish mapping relationships between objects in each group and the group identifier of the group.

During specific implementation, a group identifier may be any value or character string or the like that can be used to distinguish different groups. For example, based on the foregoing Example 1, A may be used as a group identifier of a group to which objects whose initial characters are A (or a) belong, and other letters are similar thereto, and "#" may be used as a group identifier of a group to which objects whose initial characters are numbers belong. Based on the foregoing Example 2, when the grouping is performed according to a month of a creation time, the terminal device may use a month of creation times of objects in each group as a group identifier of the group. Based on the foregoing Example 3, the terminal device may use a range of a size of storage space occupied by objects in each group as a group identifier of the group.

Step S308: Generate, using the view control, a view including all the group identifiers and the multiple objects.

Step S309: Display at least a part of the view.

Step S310: When receiving a selection instruction for a first group identifier, preferentially display an object corresponding to the first group identifier, where the first group identifier is any group identifier of all the group identifiers.

It should be noted that, compared with the solution in the other approaches, the technical solution provided in this embodiment in which to-be-displayed objects in an application are sorted according to initial letters to generate and display a view has a relatively low requirement on an application. Further, even if the application does not include a control for sorting, the technical solution provided in this embodiment of the present disclosure can be used as long as the operating system of the terminal device includes the view control.

Figure 4:
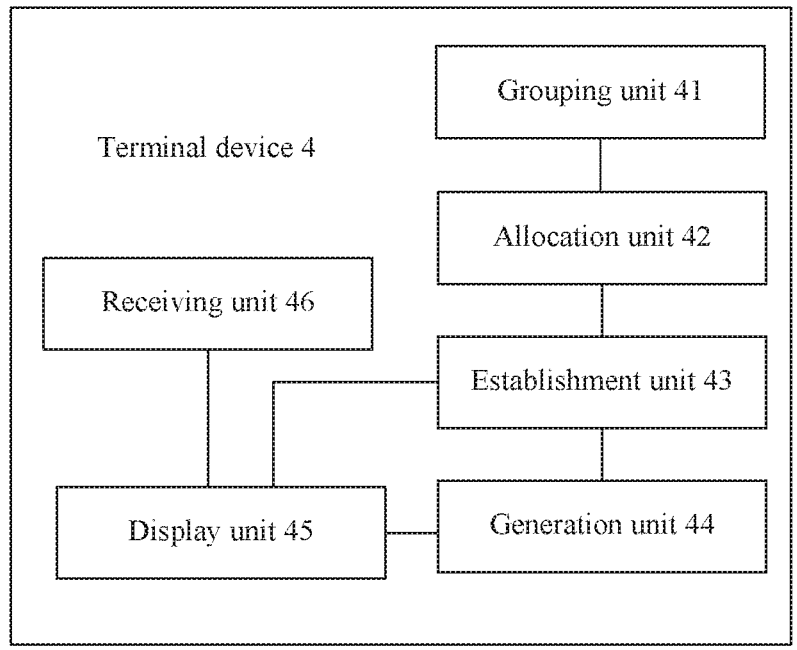
FIG. 4 is a schematic structural diagram of a terminal device according to an embodiment of the present disclosure.

FIG. 4 shows a terminal device 4 provided in an embodiment of the present disclosure. The terminal device 4 is configured to execute the methods for displaying a view provided above. For explanations of related content in this embodiment, refer to the foregoing method embodiments. Details are not described herein again.

A view control and at least one application are installed on the terminal device 4, the view control is a control in an operating system of the terminal device 4, and the terminal device 4 includes a grouping unit 41 configured to group multiple to-be-displayed objects in a first application using the view control, where the first application is any application of the at least one application, an allocation unit 42 configured to allocate a group identifier to each group, an establishment unit 43 configured to establish mapping relationships between objects in each group and the group identifier of the group, a generation unit 44 configured to generate, using the view control, a view including all the group identifiers and the multiple objects, a display unit 45 configured to display at least a part of the view, and a receiving unit 46 configured to receive a selection instruction for a first group identifier, where the first group identifier is any group identifier of all the group identifiers, and the display unit 45 is further configured to preferentially display an object corresponding to the first group identifier when the receiving unit 46 receives the selection instruction for the first group identifier.

Optionally, the grouping unit 41 is further configured to group the multiple objects using the view control when a quantity of the multiple to-be-displayed objects in the first application is greater than or equal to a preset threshold.

Figure 5:
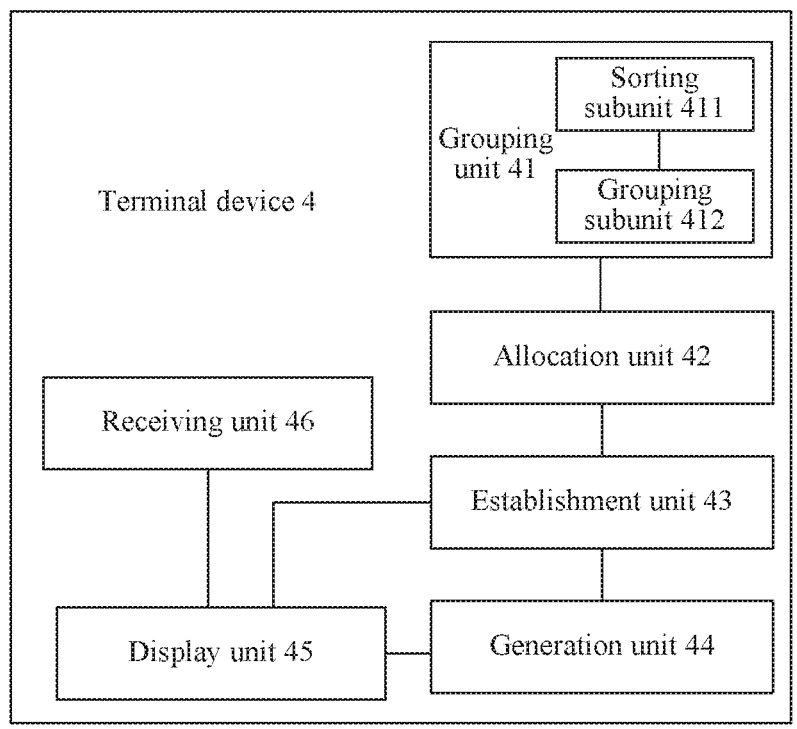
FIG. 5 is a schematic structural diagram of another terminal device according to an embodiment of the present disclosure.

Optionally, as shown in FIG. 5, the grouping unit 41 includes a sorting subunit 411 configured to sort the multiple to-be-displayed objects in the first application using the view control, and a grouping subunit 412 configured to group the multiple sorted objects.

In an implementation manner, the grouping subunit 412 is further configured to group the multiple sorted objects according to a sorting attribute of the sorting.

In this implementation manner, optionally, the grouping subunit 412 is further configured to group the multiple sorted objects according to a character corresponding to each object when a type of the sorting attribute of the sorting is a character string type, or group the multiple sorted objects according to a value corresponding to each object when a type of the sorting attribute of the sorting is a value type.

In another implementation manner, the grouping subunit 412 is further configured to group the multiple sorted objects according to a preset quantity, where each group includes a preset quantity of objects.

In a hardware implementation, the grouping unit 41, the allocation unit 42, the establishment unit 43, and the generation unit 44 may be stored in a memory in a software form such that a processor invokes the units to execute operations corresponding to the units. The processor may be a central processing unit (CPU), a microprocessor, a single-chip microcomputer, or the like. The display unit 45 may be a display. The receiving unit 46 may be an input apparatus, for example, a touch screen.

Figure 6:
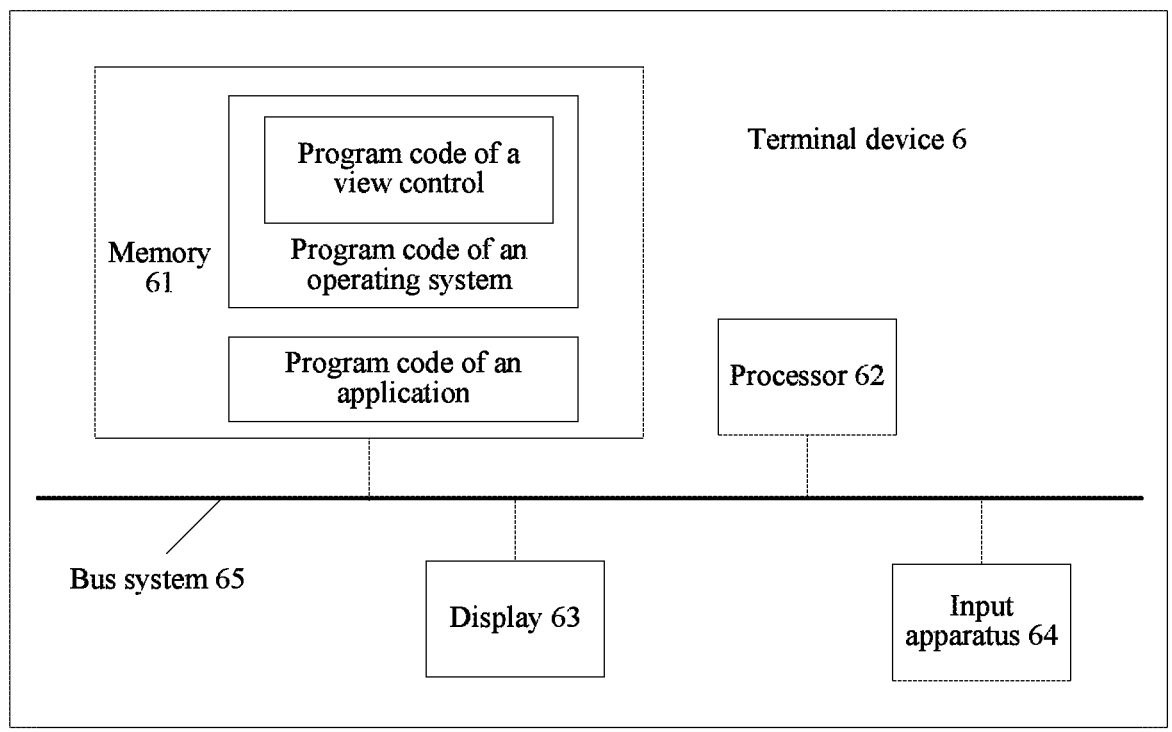
FIG. 6 is a schematic structural diagram of another terminal device according to an embodiment of the present disclosure.

FIG. 6 shows a terminal device 6 provided in an embodiment of the present disclosure. The terminal device 6 is configured to execute the methods for displaying a view provided above. For explanations of related content in this embodiment, refer to the foregoing method embodiments. Details are not described herein again.

A view control and at least one application are installed on the terminal device 6, the view control is a control in an operating system of the terminal device 6, and the terminal device 6 includes a memory 61, a processor 62, a display 63, an input apparatus 64, and a bus system 65.

The memory 61, the processor 62, the display 63, and the input apparatus 64 are coupled together using the bus system 65. The bus system 65 may be an industry standard architecture (ISA) bus, a peripheral component interconnect (PCI) bus, an extended ISA (EISA) bus, or the like. The bus system 65 may include an address bus, a data bus, a control bus, and the like. For ease of representation, the bus system 65 in FIG. 6 is represented using only one bold line, but it does not indicate that there is only one bus or only one type of bus.

The memory 61 is configured to store a set of program code, where the set of program code includes program code of the operating system and application program code of the at least one application, and the program code of the operating system may include program code of the view control. The program code is used to control the processor 62 to execute the operations of grouping multiple to-be-displayed objects in a first application using the view control, where the first application is any application of the at least one application, allocating a group identifier to each group, establishing mapping relationships between objects in each group and the group identifier of the group, and generating, using the view control, a view including all the group identifiers and the multiple objects. The display 63 is configured to display at least a part of the view. The input apparatus 64 is configured to receive a selection instruction for a first group identifier, where the first group identifier is any group identifier of all the group identifiers, and the display 63 is further configured to preferentially display an object corresponding to the first group identifier when the input apparatus 64 receives the selection instruction for the first group identifier.

Optionally, the processor 62 is further configured to group the multiple objects using the view control when a quantity of the multiple to-be-displayed objects in the first application is greater than or equal to a preset threshold.

Optionally, the processor 62 is further configured to sort the multiple to-be-displayed objects in the first application using the view control, and group the multiple sorted objects.

In an implementation manner, the processor 62 is further configured to group the multiple sorted objects according to a sorting attribute of the sorting.

In this implementation manner, optionally, the processor 62 is further configured to group the multiple sorted objects according to a character corresponding to each object when a type of the sorting attribute of the sorting is a character string type, or group the multiple sorted objects according to a value corresponding to each object when a type of the sorting attribute of the sorting is a value type.

In another implementation manner, the processor 62 is further configured to group the multiple sorted objects according to a preset quantity, where each group includes a preset quantity of objects.

The terminal device 6 provided in this embodiment of the present disclosure groups to-be-displayed objects in a first application using a view control in an operating system, allocates a group identifier to each group, establishes mapping relationships between objects in each group and the group identifier corresponding to the group in order to generate a view including all the group identifiers and the multiple objects, displays at least a part of the view, and preferentially displays an object corresponding to the first group identifier when receiving a selection instruction for a first group identifier. In this way, when a user needs to search for and select a target object, the user may rapidly determine a general range of the target object by selecting a group identifier in order to search for the target object within the range, thereby improving a rate of searching for the target object. In addition, the view control in this solution is a control in the operating system, and therefore can generate a view for every application installed on the terminal device. Compared with the other approaches in which a control based on an application generates a view for an object in the application, this solution can expand the application scope.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all the units may be selected according to actual requirements to achieve the objectives of the solutions of the embodiments. Some or all the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for displaying a view, applied to a terminal device on which a ListView control and a plurality of applications are installed, wherein the method comprises:
grouping a plurality of to-be-displayed objects in each of the applications using the ListView control when a quantity of the to-be-displayed objects in each of the applications is greater than a preset threshold, wherein the ListView control is a control in an operating system of the terminal device;
allocating a group identifier to each group;
establishing mapping relationships between objects in each group and a group identifier of a corresponding group;
sorting the to-be-displayed objects in each of the applications using the ListView control to produce a plurality of sorted to-be-displayed objects, wherein a first one of the plurality of applications sorts based on an alphabet, wherein a second one of the plurality of applications sorts based on a size, and wherein a third one of the plurality of applications sorts based on a creation date;
generating, using the ListView control, a ListView comprising all group identifiers and the sorted to-be-displayed objects;
displaying at least a part of the ListView; and
displaying an object corresponding to a first group identifier when receiving a selection instruction for the first group identifier, wherein the first group identifier is any group identifier of all the group identifiers.

2. The method of claim 1, wherein grouping the to-be-displayed objects comprises grouping the sorted to-be-displayed objects.

3. The method of claim 2, wherein grouping the sorted to-be-displayed objects comprises grouping the sorted to-be-displayed objects according to a sorting attribute.

4. The method of claim 3, wherein grouping the sorted to-be-displayed objects according to the sorting attribute comprises:
grouping the sorted to-be-displayed objects according to a character corresponding to each object when a type of the sorting attribute is a character string type; and
grouping the sorted to-be-displayed objects according to a value corresponding to each object when the type of the sorting attribute is a value type.

5. The method of claim 2, wherein grouping the sorted objects comprises grouping the sorted to-be-displayed objects according to a preset quantity, and wherein each group comprises a preset quantity of objects.

6. The method of claim 1, further comprising:
comparing a number of the to-be-displayed objects within each of the applications to a threshold value; and
grouping the to-be-displayed objects within the applications when the number of the to-be-displayed objects is greater than the threshold value.

7. The method of claim 1, wherein the ListView further comprises attributes of the to-be-displayed objects.

8. A terminal device, wherein a ListView control and a plurality of applications are installed on the terminal device, and wherein the terminal device comprises:
an input apparatus configured to receive a selection instruction for a first group identifier, wherein the first group identifier is any group identifier of a plurality of group identifiers;
a memory configured to store a set of program code;
a processor, wherein the set of program code causes the processor to be configured to:
group a plurality of to-be-displayed objects in each of the applications using the ListView control when a quantity of the to-be-displayed objects in each of the applications is greater than a preset threshold, wherein the ListView control is a control in an operating system of the terminal device;
allocate one of the group identifiers to each group;
establish mapping relationships between objects in each group and the group identifier of a corresponding group;
sort the to-be-displayed objects in each of the applications using the ListView control to produce a plurality of sorted to-be-displayed objects, wherein a first one of the applications sorts based on an alphabet, wherein a second one of the applications sorts based on a size, and wherein a third one of the applications sorts based on a creation date; and
generate, using the ListView control, a ListView comprising all group identifiers and the sorted to-be-displayed objects;
a display configured to:
display at least a part of the ListView; and
display an object corresponding to the first group identifier when the input apparatus receives the selection instruction for the first group identifier; and
a bus coupling the memory, the processor, the display, and the input apparatus together.

9. The terminal device of claim 8, wherein the set of program code further causes the processor to be configured to group the sorted to-be-displayed objects.

10. The terminal device of claim 9, wherein the set of program code further causes the processor to be configured to group the sorted to-be-displayed objects according to a sorting attribute.

11. The terminal device of claim 10, wherein the set of program code further causes the processor to be configured to:
group the sorted to be displayed objects according to a character corresponding to each object when a type of the sorting attribute is a character string type; and
group the sorted to-be-displayed objects according to a value corresponding to each object when the type of the sorting attribute is a value type.

12. The terminal device of claim 9, wherein the set of program code further causes the processor to be configured to group the sorted to-be-displayed objects according to a preset quantity, and wherein each group comprises a preset quantity of objects.

13. The terminal device of claim 8, wherein the set of program code further causes the processor to be configured to:
compare a number of the to-be-displayed objects within each of the applications to a threshold value; and
group the to-be-displayed objects within the applications when the number of the to-be-displayed objects is greater than the threshold value.

14. The terminal device of claim 8, wherein the alphabet comprises an English alphabet, Chinese characters, or pinyin.

15. The terminal device of claim 8, wherein the size comprises a file size in bytes.

16. The terminal device of claim 8, wherein the ListView further comprises attributes of the to-be-displayed objects.

17. A non-transitory computer-readable storage medium comprising instructions, wherein when executed by a computer, cause the computer, on which a ListView control and a plurality of applications are installed to carry out the steps of:
grouping a to-be-displayed objects in each of the applications using the ListView control, wherein the ListView control is a control in an operating system of the computer;
allocating a group identifier to each group;
establishing mapping relationships between objects in each group and a group identifier of a corresponding group;
sorting the to-be-displayed objects in each of the applications using the ListView control to produce a plurality of sorted to-be-displayed objects, wherein a first one of the applications sorts based on an alphabet, wherein a second one of the applications sorts based on a size, and wherein a third one of the applications sorts based on a creation date;
generating, using the ListView control, a ListView comprising all group identifiers and the sorted to-be-displayed objects;
displaying at least a part of the ListView; and
displaying an object corresponding to a first group identifier when receiving a selection instruction for the first group identifier,
wherein the first group identifier is any group identifier of all the group identifiers.

18. The non-transitory computer-readable storage medium of claim 17, wherein the instructions further cause the computer to carry out the steps of grouping the sorted to-be-displayed objects according to a sorting attribute, and wherein when grouping the sorted to-be-displayed objects, the instructions further cause the computer to carry out the steps of:
grouping the sorted to-be-displayed objects according to a character corresponding to each object when a type of the sorting attribute is a character string type; and
grouping the sorted to-be-displayed objects according to a value corresponding to each object when the type of the sorting attribute is a value type.

19. The non-transitory computer-readable storage medium of claim 17, wherein the ListView further comprises attributes of the to-be-displayed objects.

20. The non-transitory computer-readable storage medium of claim 17, wherein the alphabet comprises an English alphabet, a Chinese character, or pinyin.

* * * * *

UNITED STATES PATENT AND TRADEMARK OFFICE
CERTIFICATE OF CORRECTION

PATENT NO. : 10,936,152 B2
APPLICATION NO. : 15/570206
DATED : March 2, 2021
INVENTOR(S) : Dong Zhang Page 1 of 1

It is certified that error appears in the above-identified patent and that said Letters Patent is hereby corrected as shown below:

In the Claims

Claim 17, Column 15, Line 21: "grouping a to-be-displayed" should read "grouping a plurality of to-be-displayed"

Signed and Sealed this
Fourth Day of May, 2021

Drew Hirshfeld
*Performing the Functions and Duties of the
Under Secretary of Commerce for Intellectual Property and
Director of the United States Patent and Trademark Office*